US006236387B1

(12) United States Patent
Imada

(10) Patent No.: US 6,236,387 B1
(45) Date of Patent: May 22, 2001

(54) PAGE DISPLAY SYSTEM, METHOD THEREFOR, AND RECORDING MEDIUM CONTAINING PROGRAM FOR DISPLAYING PAGE

(75) Inventor: Hideaki Imada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/185,638

(22) Filed: Nov. 4, 1998

(30) Foreign Application Priority Data

Nov. 6, 1997 (JP) .................................................. 9-302896

(51) Int. Cl.$^7$ ...................................................... G09G 5/00
(52) U.S. Cl. ............................................. 345/113; 345/123
(58) Field of Search ........................... 345/112–114, 123, 345/124, 435, 973

(56) References Cited

U.S. PATENT DOCUMENTS 5,351,995 * 10/1994 Booker ................................ 283/117

FOREIGN PATENT DOCUMENTS

| 62-18595 | 1/1987 | (JP) . |
| 63-4317 | 1/1988 | (JP) . |
| 64-68740 | 3/1989 | (JP) . |
| 1-319870 | 12/1989 | (JP) . |
| 2-140823 | 5/1990 | (JP) . |
| 5-94503 | 4/1993 | (JP) . |
| 7-56935 | 3/1995 | (JP) . |
| 7-230469 | 8/1995 | (JP) . |

* cited by examiner

Primary Examiner—Matthew Luu
Assistant Examiner—G. F. Cunningham
(74) Attorney, Agent, or Firm—Sughrue, Mion, Zinn, MacPeak & Seas, PLLC

(57) ABSTRACT

A page display system is provided for improving an intuitive visibility of letters and lines of letters as patterns by increasing the time for displaying each page.

A formatter 13 of the page display system interprets and arrange the structured text 11 into page units, a rasterizer expands letters of the structured text 11 into fonts to form image patterns and generate each page image by synthesizing with images of attached data 12 and the like, and the image buffer 15 temporarily stores the thus produced page images. The image composer 16 acquires page images from the image buffer and composes a plurality of images upon necessity, the display device 17 displays page images. The page scroll controller 19 adjust the composition of images by the image composer 16. The timer 20 transmits information indicating the passage of time.

12 Claims, 6 Drawing Sheets

PAGE DISPLAY SYSTEM, METHOD THEREFOR, AND RECORDING MEDIUM CONTAINING PROGRAM FOR DISPLAYING PAGE

BACKGROUND OF THE INVENTION

1. Field of the Invention

This invention relates to a page display system, a method of displaying pages, and a recording medium containing a program for displaying pages, and particularly relates to a page display system, a method therefor, and a recording medium containing a program for indicating pages, utilizing after-images.

This application is based on Patent Application No. Hei.9-302896 filed in Japan, the content of which is incorporated herein by reference.

2. Background Art

Four million years have passed since the birth of human beings. The invention of paper brought a great progress in accumulation of information. The invention of the typography by Gutenberg in the fifteenth century has further produced remarkable progress in the transmission and accumulation of information. Until recent years, paper has been widely used as a recording medium due to its fine visibility. Paper is thin, supple, and elastic. These characteristics of paper enable reading of printed papers by handling papers and turning pages such that parcels of necessary information are extracted by identifying letters as a pattern from many pages in a bundle of papers within a short time.

Recently, as computerization advances with the progress of electronics, called the second industrial revolution, information is often displayed by display devices such as cathode-ray tubes and LCDs (Liquid Crystal Display). However, since such devices are self-luminous and inferior in resolution, letters or lines of letters as patterns displayed in such display devices are inferior in high speed and intuitive visibility than those on paper. This constitutes a basic reason for obstruction of the spread of electronic apparatuses for displaying lengthy documents such as, for example, electronic books, and obstruction of the arrival of the paperless age.

Japanese Patent Application, First Publication No. Sho 62-18595 discloses a display device which is capable of improving visibility by utilizing after-images. This device displays a sum of both multiplication products, one of which is a multiplication product of an output of a first frame buffer by an output from a display control circuit and another is a multiplication product of an output of a second frame buffer by a compliment of an output of a display control circuit.

The first problem of the hereinabove described conventional device is in that it is not possible for the device to control the timing of the displayed after-image at any time on request of a user. The problem is due to the fact that the time to display the after-image is not alterable, since an output from the display control circuit is constantly being generated.

The second problem is that the conventional device cannot perform processing of structured text. This is because the device is not provided with means to convert the structured text into picture images.

The third problem is that the device cannnot send or scroll pages in the opposite direction (that is, return to the previous images). This is because the device is not provided with a means to send pages in the opposite direction.

It is therefore the object of the present invention to provide a system which is capable of improving the visibility of letters or lines of letters as patterns by increasing an information content displayed at a time point by composing the after-image of the previous page on the presently displayed page as well as by increasing the total time for displaying one page.

SUMMARY OF THE INVENTION

A page display system according to the first embodiment of the present invention is provided for inspecting a plurality of pages of a structured text, which can not be displayed on one page, by scrolling pages either in forward or backward directions, in order to improve the intuitive visibility of letters and lines of letters as image patterns. This system is provided with a means to determine a waiting time for replacing a page by a user's direction, and a means for increasing an information content of the display and for automatically increasing a total time of displaying a page by composing the previous image as an after-image on the present page being displayed on a display, while controlling a brightness of the after-image by comparing the display start time of the previous page with that of the present image.

A page display system according to the second embodiment of the present invention is provided with, (a) a formatter for interpreting a structured text, arranging the structured text into a page unit, and for preparing the form of the page;

(b) a rasterizer for expanding letters into fonts to transform them into a pattern, and for generating a page image as a unit page with an attached data image, when the attached data is directed by the structured text so as to be incorporated into the page;

(c) an image buffer for storing unit page images corresponding to two pages generated by said rasterizer;

(d) an image composer for synthesizing said unit page images corresponding to two pages stored in said image buffer;

(e) a display device for displaying said composed image formed by said image composer;

(f) a page scroll controller having a slider to be controlled by a user for scrolling pages in the backward direction when a cursor is moved to a left side region from the center of the slider, for scrolling pages in the forward direction when the cursor is moved to the right side region of the slider, and the page scrolling speed is proportional to an angular displacement of the cursor from the center;

(g) a timer for generating a time;

(h) a composition controller for controlling a degree of composition based on both input from said page scroll controller and a time from said timer.

A page display system according to the third embodiment of the present invention is the same system as the system according to the second embodiment and the image composer outputs a brightness value of each pixel of the composed image by calculating a sum of both multiplication products, one is a multiplication product of a brightness value of each pixel of the previous page image stored in said image buffer by f (t), and another is a multiplication product of a brightness values of each pixel of the present image by 1-f(t).

A first method of displaying pages for inspecting a plurality of pages of structured text, which can not be displayed in one page, by scrolling pages in either forward or backward directions, comprising the steps of:

determining a waiting time for replacing pages by a user's direction;

increasing an amount of displayed information and automatically increasing a time of displaying a page by superposing the previous image as an after-image on the present displayed page, after controlling a brightness of the after-image by comparison with that of the present image, which results in improving the intuitive visibility of letters and lines of letters as pattern images.

The second method of displaying pages comprises:

(a) a first step to make a formatter interpret a structured text, arrange the structured text into unit pages, and prepare a form of page;

(b) a second step to make a rasterizer expand letters into fonts to transform them into a pattern, and generate a page image as a unit page with an attached data, when the attached data is directed by the structured text so as to be incorporated in the page;

(c) a third step to make an image buffer store unit page images corresponding to two pages generated by said rasterizer;

(d) a fourth step to make an image composer compose said unit page images corresponding to two pages stored in said image buffer;

(e) a fifth step to make a display device display said composed image formed by said image composer;

(f) a sixth step to make a page scroll controller having a slider to be controlled by a user send pages in the backward direction when a cursor is moved to a left side region from the center of the slider, send pages in the forward direction when the cursor is moved to the right side region of the slider, and the page scroll speed is proportional to an angular displacement of the cursor from the center;

(g) a seventh step to make a timer generate a time; and (h) an eighth step to make a composition controller control a degree of composition based on both input from said page scroll controller and a time from said timer.

The third method of displaying pages is the same as the method by the second embodiment except that the fourth step makes the image composer output a brightness value of each pixel of the composed image by calculating a sum of a multiplication of a brightness value of each pixel of the previous page image stored in said image buffer by f (t), and a multiplication of a brightness values of each pixel of the present image by 1-f(t).

The first recording medium containing a program for inspecting a plurality of pages of a structured text, which can not be displayed in one page, by scrolling pages in either forward or backward directions, comprising:

a means to determine a waiting time for replacing pages by a user's direction;

a means for increasing an amount of displayed information and for automatically increasing a time of displaying a page by superposing the previous image as an after-image on the present displayed page, after controlling a brightness of the after-image by comparison with that of the present image for improving the intuitive visibility of letters and lines of letters as a pattern, The second recording medium containing a program for making computer execute:

(a) a first step to make a formatter interpret a structured text, arrange the structured text into unit pages, and prepare a form of page;

(b) a second step to make a rasterizer expand letters into fonts to transform them into a pattern, and generate a page image as a unit page with an attached data, when the attached data is directed by the structured text so as to be incorporated in the page;

(c) a third step to make an image buffer store unit page images corresponding to two pages generated by said rasterizer;

(d) a fourth step to make an image composer compose said unit page images corresponding to two pages stored in said image buffer;

(e) a fifth step to make a display device display said composed image formed by said image composer;

(f) a sixth step to make a page scroll controller having a slider to be controlled by a user send pages in the backward direction when a cursor is moved to a left side region from the center of the slider, send pages in the forward direction when the cursor is moved to the right side region of the slider, and the page scroll speed is proportional to an angular displacement of the cursor from the center;

(g) a seventh step to make a timer generate a time; and (h) an eighth step to make a composition controller control a degree of composition based on both input from said page scroll controller and a time from said timer.

A third recording medium containing a program which is the same as the second program, in which said fourth step makes the image composer output a brightness value of each pixel of the composed image by calculating a sum of a multiplication of a brightness value of each pixel of the previous page image stored in said image buffer by f (t), and a multiplication of a brightness values of each pixel of the present image with by 1-f(t).

A fourth page display system which is the same as the second system further comprises an image buffer which is able to store page images corresponding to more than 3 pages.

A fifth page display system, which is the same as the first system, and having LCDs as the display device and the fifth system comprises a plurality of LCDs in piles so as to be able to display a plurality of pages simultaneously.

A sixth page display system which is the same as the first page display system, and having projector type display devices as the display device and this sixth system is capable of displaying a plurality of pages on a screen simultaneously by the use of said plurality of projectors.

These embodiments can be used alone or in combinations of two or more.

DESCRIPTION OF PREFERRED EMBODIMENTS

Figure 1:
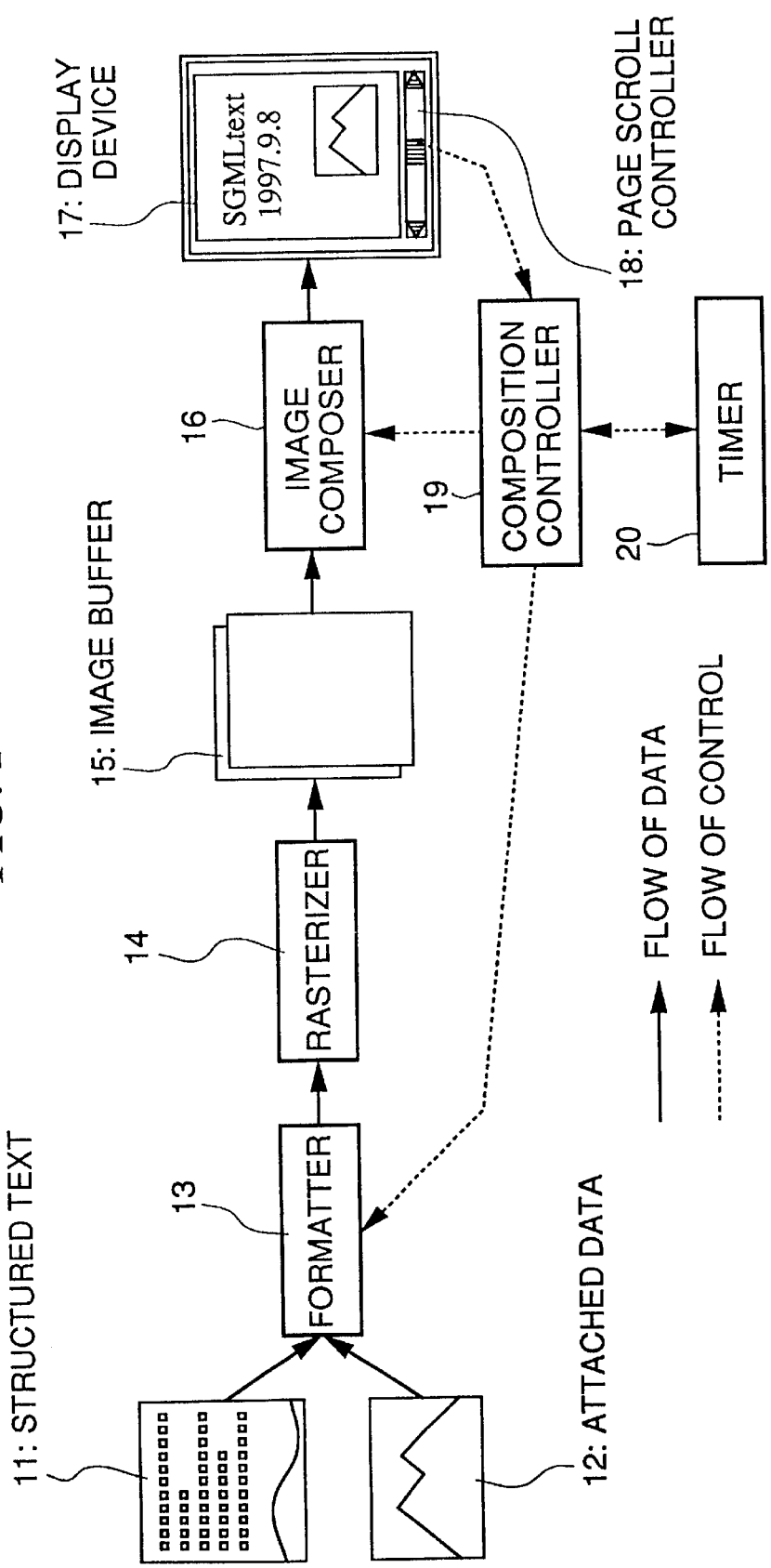
FIG. 1 is a block diagram showing an embodiment of the present invention.

A system according to the first embodiment of the present invention is described hereinafter referring to FIG. 1. FIG.

1 shows a system according to the first embodiment of the present invention. As shown in FIG. 1, the present system of this embodiment comprises a structured text 11, attached data 12, a formatter 13, a rasterizer 14, a page-image buffer 15, an image composer 16, a display device 17, a page scroll controller 18, a composition controller 19, and a timer 20.

The structured text 11, which is represented by HTML (Hyper Text Markup Language) or SGML (Standard Generalized Markup Language), is a text file expressed by the embodiment of the present invention. The attached data 12 are a data file excluding the structured text and including images and voices for complimenting the structured text 11. The attached data 12 are referred to from the structured text 11.

The formatter 13 arranges the structured text 11 into page units by the interpretation of the structured text 11. The rasterizer 14 expands letter information into fonts for conversion into images, and generates page images per unit page by incorporating the attached data 12 with the page image. The page-image buffer 15 is a buffer for storing page-images per unit page temporarily which are generated by the rasterizer 14. The page-image buffer has an area corresponding to 2 pages.

The image composer 16 acquires page-images from the page-image buffer 15 and composes a plurality of page-images in accordance with necessary. The display device 17 displays the page image generated by the image composer 16.

The page scroll controller 18 is a controller by which a user controls a speed of image scrolling. For the preferred embodiments of the present invention, "scrolling" includes fading, dissolving or diminishing persistence of pages into or out of view. In order to perform stepless control of the image scrolling speed, the controller is designed such that, after setting a slider at a center position at first, when the user moves the cursor to the left side, the page scrolls back to the previous page, when the user moves the cursor to the right, then the page scrolls forward, and the speed of the page scroll is proportional to the distance of the cursor from the center position.

The composition controller 19 receives an input from the page scroll controller 18 and controls a degree of composition of images by the image composer 16. The timer is used for transmitting information indicating the passage of time to the composition controller 19.

Figure 2:
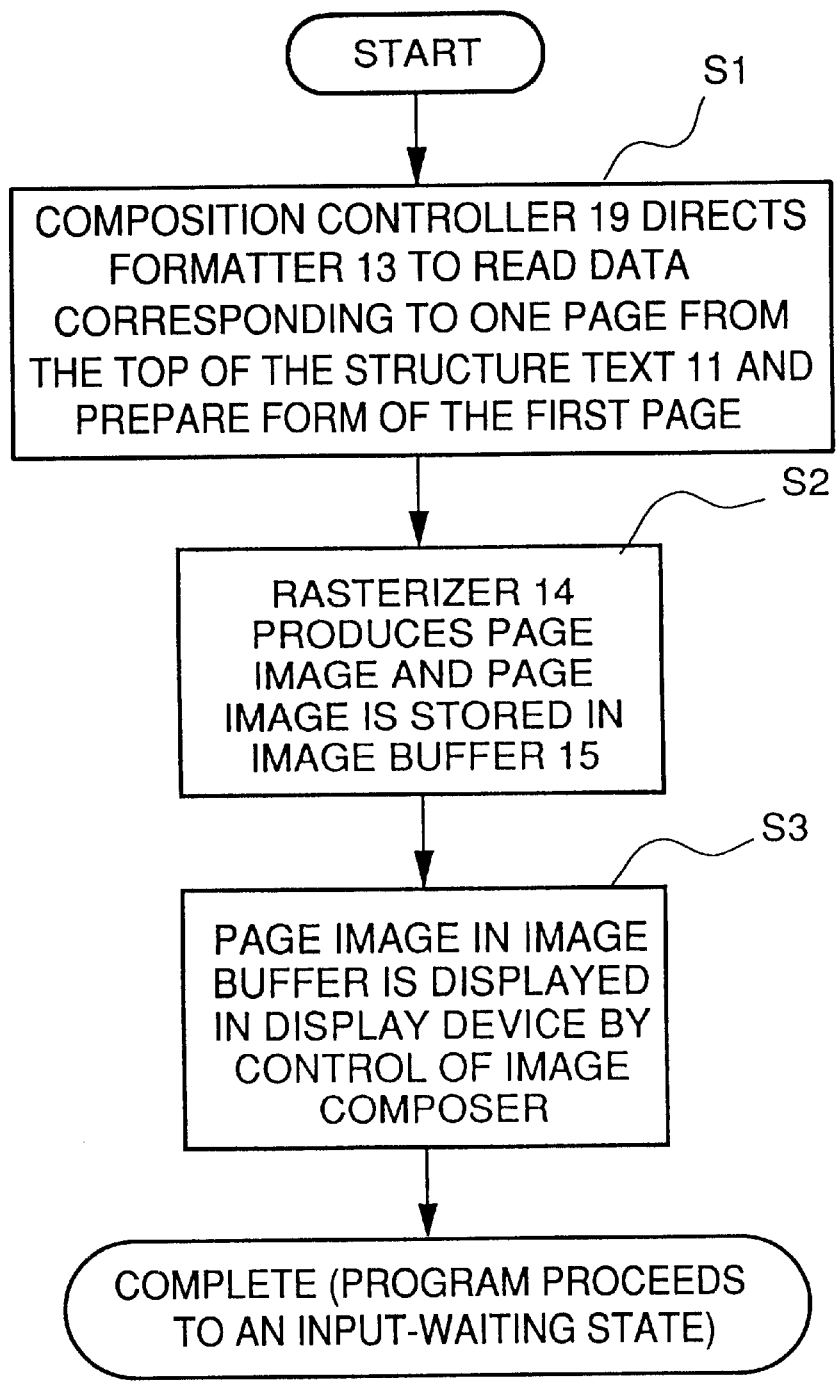
FIG. 2 is a flow-chart showing the initialization operation.

An operation of the system of the present embodiment will be described hereinafter referring to FIG. 2 to FIG. 5. An initialization operation is first described referring to FIG. 2, which illustrates a flow-chart of the initialization operation. As shown in FIG. 2, the composition controller 19 directs the formatter 13 to read data corresponding to one page from the top of the structured text 11, and to prepare a form as a page after laying out the attached data, if the attached data are directed by the structured text 11 so as to be incorporated in the page (Step S1 in FIG. 2). After completion of the page form, the rasterizer 14 expands letters of the structured text 11 into images using fonts and produces a page image of a page. The thus produced page image is stored in one side of the page image buffer 15 (Step S2 in FIG. 2).

After the page image is stored in one side of the page image buffer 15, the composition controller 19 directs output to and display of the as-produced page image on the display device (Step S3 in FIG. 2) The program proceeds to an input-waiting state.

Figure 3:
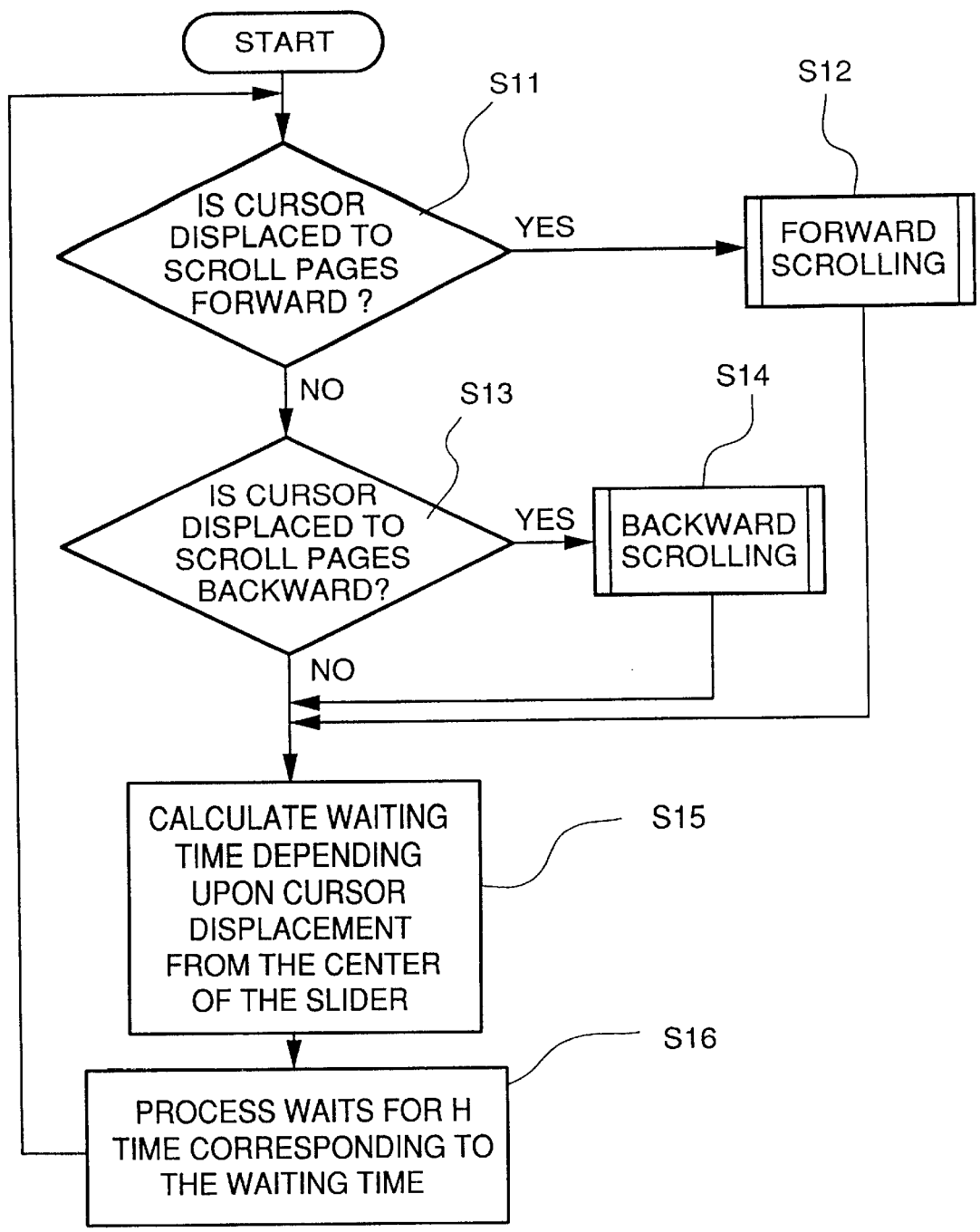
FIG. 3 show a flow-chart showing operations at the waiting state for an input.

An operation at an input waiting state is described referring to FIG. 3. FIG. 3 shows a flow-chart showing an operation at the input wait state. As shown in FIG. 3, the composition controller 19 always monitors the page scroll controller 18, and when the cursor is slid into a region of the forward direction by the user ("yes" at Step S11 in FIG. 3), then the controller 19 proceeds to scroll in the forward direction (Step S12 in FIG. 3). If the user moves the cursor into the opposite region ("yes" at Step S13 in FIG. 3), the controller 19 proceeds to scroll pages in the opposite or backward direction (Step S14 in FIG. 3).

If the answers at Steps S11 and S13 are neither yes nor no, or when the page scrolling process is completed, a waiting time is calculated which corresponds to a time interval until the state of the page scroll controller 18 is monitored next time (Step S15 in FIG. 3). The waiting time is set such that the larger the displacement of the cursor from the center position of the slide, the shorter the waiting time. Thus, if the displacement of the cursor from the zero position is larger, the controller 19 directs execution of the scroll operation more frequently. Once the waiting time is calculated, the process waits for a time corresponding to the waiting time (Step S16 in FIG. 3), and the process in the waiting state is repeated from the start.

Figure 4:
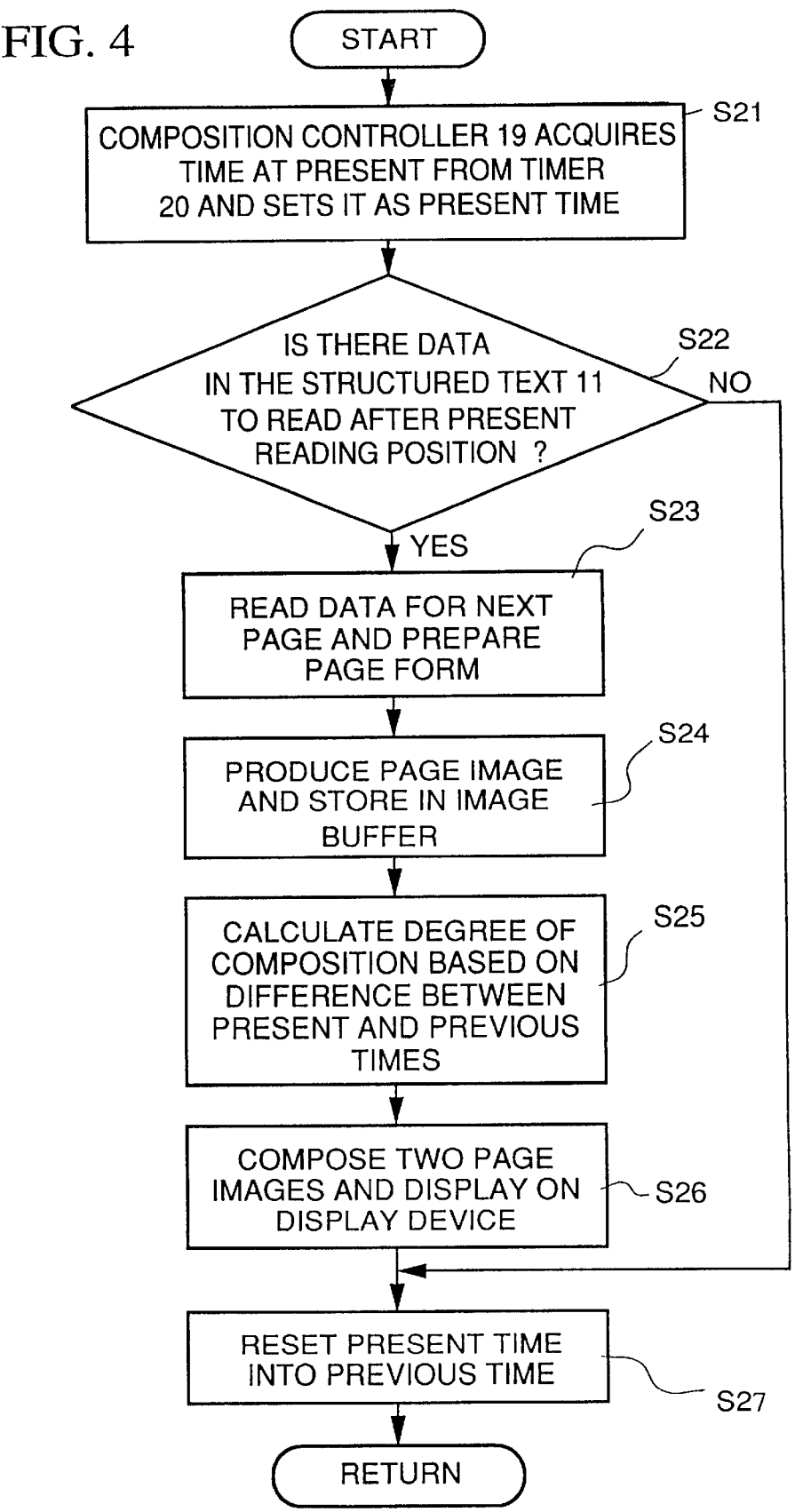
FIG. 4 is a flow-chart showing a flow of scroll pages in a sequential direction.

Next, an operation of a scroll processing in the forward direction is described hereinafter. FIG. 4 is a flow-chart showing the operation of scroll processing in the forward direction. As shown in FIG. 4, the composition controller 19 acquires the time at present from the timer 20, and store the time of this processing (Step S21 in FIG. 4). Subsequently, the composition controller 19 directs the formatter 13 to make the formatter 13 judge whether or not there are data in the structured text 11 below the previously processed position, that is, whether or not there are data for the next page (Step S22 in FIG. 4).

If there is data, the processing continues, and if not, the processing proceeds to the step S27. The composition controller 19 makes the formatter 13 read data corresponding to one page after the end of the previous reading. If the structured text has a direction to incorporate the attached data into a page, the page form is prepared by incorporating and arranging the attached data in the page (Step S23 in FIG. 4). Once the form of the page is arranged, the rasterizer 14 receives an output of the formatter 14 and produces a page image using fonts of letters, and the page image is stored in a remaining page of the memory which is not used in the previous storage (Step S24 in FIG. 4).

Next, based on the time difference between the previous time and the present time, the composition controller 19 performs a calculation as to a degree of composition, that is, a ratio of superposition of the previous page image on the present page image (Step S25 in FIG. 4).

When the time difference is represented by t, and the degree of the superposition is represented by f(t), the function f(t) attenuates from "1" at t=0 to "0" at t=T. Here, T represents a time within which the after-image disappears. T and f(t) are prescribed by a preference of the user. And, f(t) is $0 \leq f(t) \leq 1$.

The image composer 16 outputs values to the display device 17 as brightness values for respective pixels of a composed page image by calculating a sum of both values obtained by a multiplication of brightness values of pixels of the previous page image by f(t) and a multiplication of a brightness values of pixels of the present page image by 1-f(t) (Step S26 in FIG. 4).

For example, assume each brightness value of each pixel of the previous image is P, and each brightness value of each pixel of the present page image is N, and each brightness value of each pixel of the composed image is C, the relation of these brightness values are:

$$CP*f(t)+N*(1-f(t)) \qquad \text{equation(1)}$$

The ending time of the present processing is then stored as the time of the previous processing (Step S27 in FIG. 4) and the present processing is completed.

Figure 5:
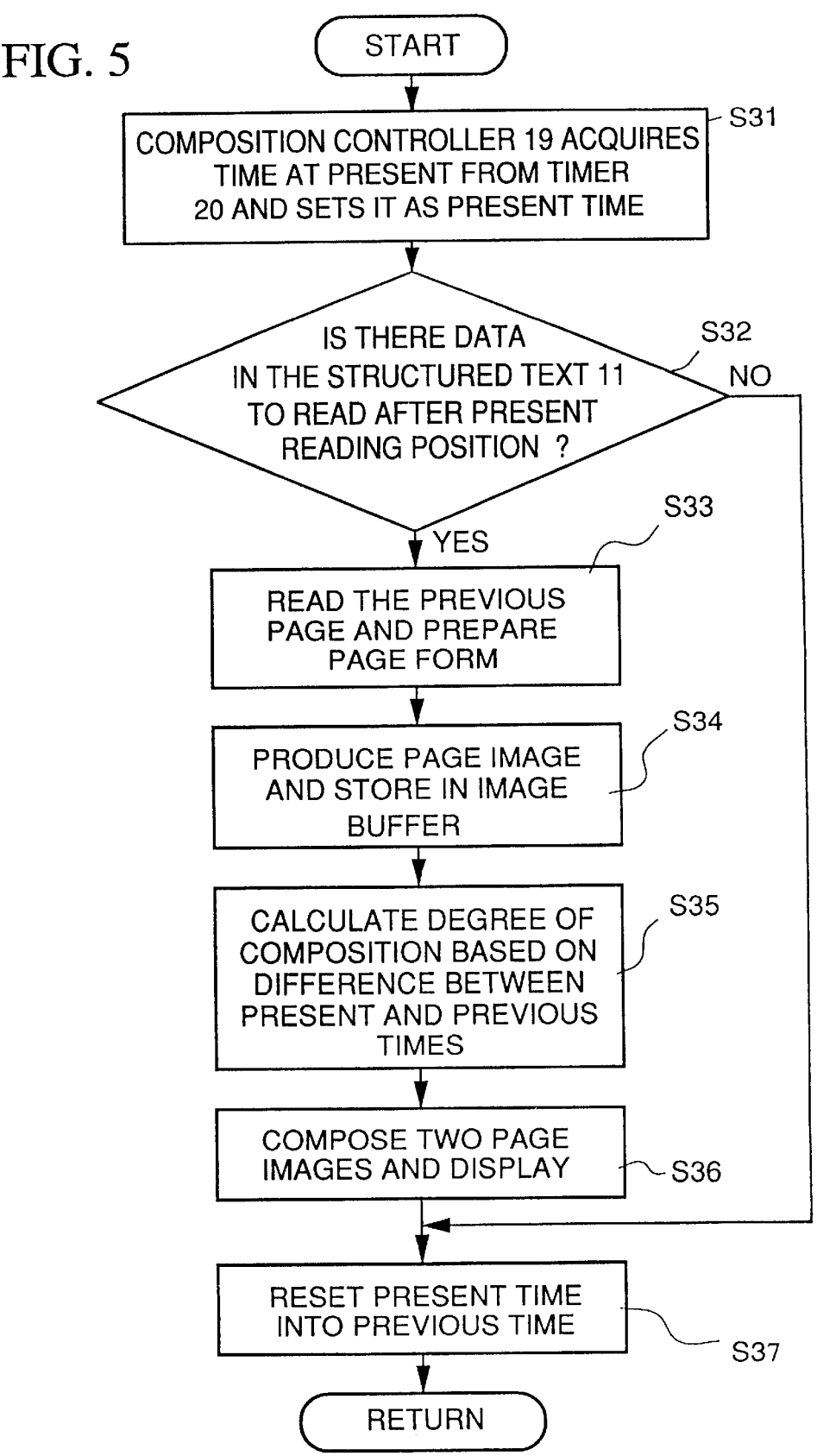
FIG. 5 is a flow-chart showing a flow of scroll pages in an opposite direction.

The page scroll operation in the backward direction is described referring to FIG. 5. FIG. 5 is a flow chart showing processes for backward scrolling. As shown in FIG. 5, the composition controller 19 acquires the present time from the timer 20 and stores it as the time of the present time (Step S31 in FIG. 5). The composition controller 19 controls the formatter 13 and make the formatter 13 judge whether there are data corresponding to two pages in the structured text 11 before the present reading position (Step S32 in FIG. 5). If there are data, processing continues and, if not, the process proceeds to Step 37. The composition controller 19 directs the formatter 13 to shift the reading position by two pages before the present reading position, and directs it to read data for one page, and, if a direction is attached to incorporate the attached data in the page, to layout an attached data and prepare a form for one page (Step S33 in FIG. 5).

Once the form is completed, the rasterizer 14 receives an output from the formatter 13, produces a page image using fonts of letters. The page image corresponding to one page is stored in the page image buffer 15 in an area which is not used by the previous processing (Step S34 in FIG. 5).

Subsequently, the composition controller 19 calculates a degree of composition as to the degree of superposition of the previous page image on the present page image based on the difference between the previous time and the present time (Step S35 in FIG. 5).

The image composer 16 receives an instruction from the composition controller 19 and outputs to the display device 17 a brightness value of each pixel of a composed image based on the above equation (1) (Step S36 in FIG. 5).

The composition controller 19 resets and stores the present time as the previous time, and complete processing.

The above description is given as to a system having a single image buffer. However, it is possible to improve the visibility of images even during high speed scrolling by providing a plurality of image buffers 15 and by indicating more than two after-images simultaneously.

Furthermore, when LCDs (Liquid Crystal Display) are used as display devices, it is also possible to construct a system to display a plurality of pages at the same time by providing a plurality of LCDs.

Moreover, when projection-type display devices are used, it is also possible to display a plurality of pages simultaneously by providing a plurality of projectors for a single screen.

Figure 6:
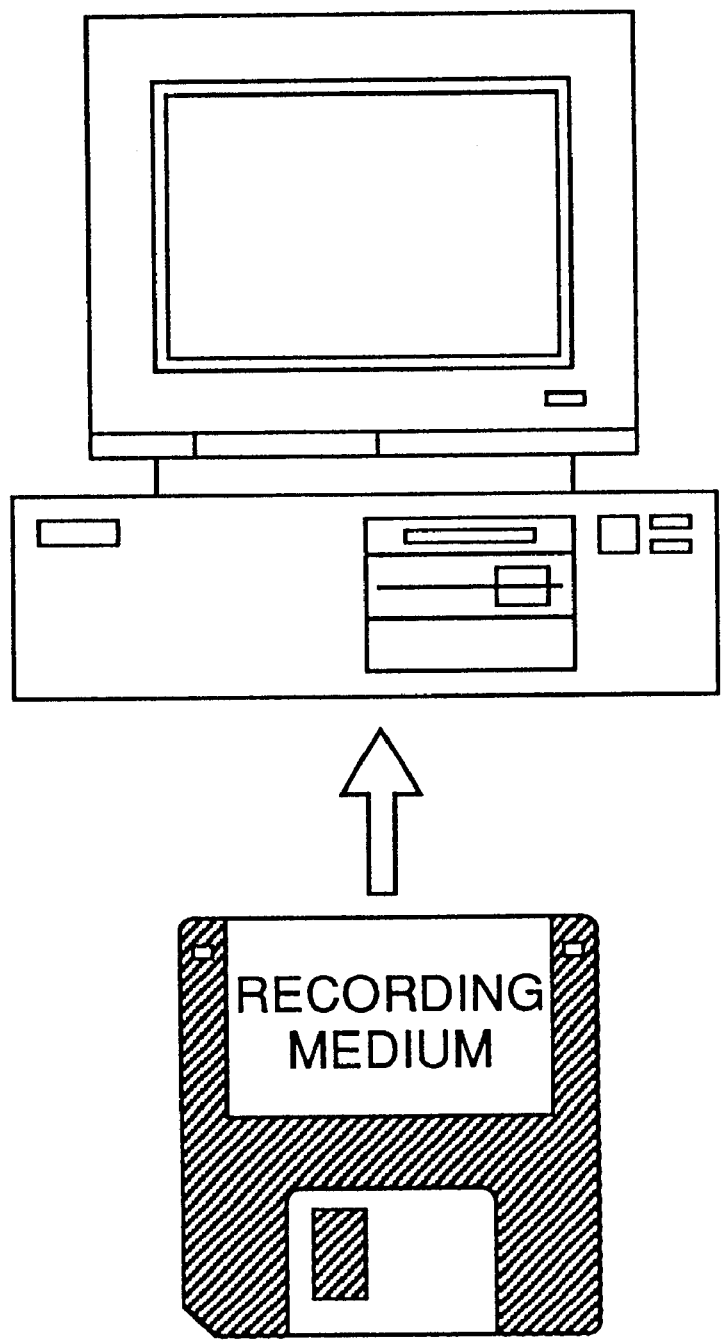
FIG. 6 shows a computer and a recording medium.

The above descriptions are given in terms of the system. However, it is also possible to describe the present invention from a point of view of the method. As shown in FIG. 6, it is further possible to execute the above method by loading a series of programs of the present invention on a hard disc of a computer from a recording medium containing these programs for realizing the above method.

Examples of the recording medium include floppy-discs, CD-ROMs, and other digital recording mediums.

The first effect of the present invention is in that a plurality of pages can be displayed simultaneously on a single screen so that a relatively long period of time can be assigned for perception of pages, while the conventional system requires perception of pages within a far shorter period of time during scrolling.

The above effect is obtained because of the following reasons. That is, assume a document is lengthy and cannot be displayed as a single picture on electric display devices such as a CRTs or LCDs. When a plurality of pages of such document is inspected at high speed by either one of forward or backward scrolling, the system and the method provided by the present system remarkably improves the intuitive visibility of a letter or lines of letters, because the information contents of page images are increased and a period of time for displaying one page is increased due to artificial superposition of the previous page image as an after-image on the image of the present page.

The second effect of the present invention is that an automatic arrangement is provided to display the after-image at any time when the user requires. The effect of the present system is obtained because the user can move the cursor of the slider to change the waiting time for switching a page.

The third effect is that the present system can process a structured text. That is because the present system is provided with a formatter which is a means for transforming the structured text to an picture image.

The fourth effect is the present system can perform scrolling in the backward direction. This is because the present system is provided with an image composer.

What is claimed is:

1. A page display system for inspecting a plurality of pages of a structured text, which cannot be displayed by one page, by scrolling pages in a forward or a backward direction, said pages being displayed as letters and lines of letters as image patterns, and said system comprising:

a system that determines a waiting time for switching pages by a user's direction, and a system that increases information content of a page image for a prescribed period and for automatically increasing a total time of displaying a page by composing a previous image as an after-image on a present page currently being displayed, while controlling a brightness of the after-image based on a comparison of a display start time of the previous image with a predetermined time.

2. A page display system according to claim 1, wherein the page display system comprises:

(a) a formatter that interprets a structured text, arranges the structured text into a unit page, and prepares a page form;

(b) a rasterizer that expands letters into fonts to transform them into a pattern, and generates a page image as said unit page with an attached data image, when the attached data are directed by the structured text so as to be incorporated in the page;

(c) an image buffer that stores unit page images corresponding to two pages generated by said rasterizer;

(d) an image composer that synthesizes said unit page images corresponding to two pages stored in said image buffer;

(e) a display device that displays said composed image formed by said image composer;

(f) a page scroll controller having a slider that is controlled by a user that scrolls pages in the backward direction when a cursor is moved to a left side region from a center of a slider, and that scrolls pages in the forward direction when the cursor is moved to a right side region of the slider, and the page scroll speed is proportional to a displacement of the cursor from the center of the slider;

(g) a timer that generates a time; and (h) a composition controller that controls a degree of composition based on an input from said page scroll controller and said time from said timer.

3. A page display system according to claim 2, wherein the image composer outputs a brightness value of each pixel of the composed image by calculating a sum of a multiplication of a brightness value of each pixel of the previous page image stored in said image buffer by f (t), and a multiplication of a brightness value of each pixel of the present image by 1-f(t).

4. A method of displaying a page having letters and lines of letters as a pattern, when a plurality of pages of a structured text, which cannot be displayed on one page, is inspected by scrolling pages in either a forward or a backward direction, comprising the steps of:

determining a waiting time for replacing pages according to a user's direction;

increasing an amount of displayed information and automatically increasing a time of displaying a page by superimposing the previous image as an after-image on the present displayed page, after controlling a brightness of the after-image by comparison with a brightness of the present image.

5. A method of displaying pages comprising:

(a) a first step to make a formatter interpret a structured text, arrange the structured text into unit pages, and prepare a form of a page;

(b) a second step to make a rasterizer expand letters into fonts to transform said fonts into a pattern, and generate a page image as a unit page with an attached data image, when the attached data image is directed by the structured text so as to be incorporated in the page;

(c) a third step to make an image buffer store unit page images corresponding to two pages generated by said rasterizer;

(d) a fourth step to make an image composer compose said unit page images corresponding to two pages stored in said image buffer;

(e) a fifth step to make a display device display said composed image formed by said image composer;

(f) a sixth step to make a page scroll controller having a slider to be controlled by a user send pages in a backward direction when a cursor is moved to a left side region from the center of the slider and send pages in a forward direction when the cursor is moved to the right side region of the slider, wherein the page scroll speed is proportional to a displacement of the cursor from the center of the slider;

(g) a seventh step to make a timer generate a time; and (h) an eighth step to make a composition controller control a degree of composition based on an input from said page scroll controller and a time from said timer.

6. A method of displaying pages according to claim 5, wherein said fourth step makes the image composer output a brightness value of each pixel of the composed image by calculating a sum of a multiplication of a brightness value of each pixel of the previous page image stored in said image buffer by f (t), and a multiplication of a brightness value of each pixel of the present image by 1-f(t).

7. A recording medium containing a program for displaying letters and lines of letters as a pattern of a plurality of pages, when said plurality of pages of a structured text, which cannot be displayed in one page, are inspected by scrolling said pages in either a forward or a backward direction, said program comprising:

a system that determines a waiting time for transition of a page by a user's instruction;

a system that increases an amount of displayed information and for automatically increasing a time of displaying a page by superimposing the previous image as an after-image on the present displayed page, after controlling a brightness of the after-image by comparison with that of the present image.

8. A recording medium containing a program for making a computer execute the following steps:

(a) a first step to make a formatter interpret a structured text, arrange the structured text into unit pages, and prepare the page form;

(b) a second step to make a rasterizer expand letters into fonts to transform said fonts into a pattern, and generate a page image as a unit page with an attached data image, when the structured text provides an instruction to incorporate the attached data in the page;

(c) a third step to make an image buffer store unit page images corresponding to two pages generated by said rasterizer;

(d) a fourth step to make an image composer compose said unit page images corresponding to two pages stored in said image buffer;

(e) a fifth step to make a display device display said composed image formed by said image composer;

(f) a sixth step to make a page scroll controller having a slider to be controlled by a user send pages in the backward direction when a cursor is moved to a left side region from the center of the slider, send pages in the forward direction when the cursor is moved to the right side region of the slider, and the page scroll speed is proportional to a displacement of the cursor from the center of the slider;

(g) a seventh step to make a timer generate a time; and (h) an eighth step to make a composition controller control a degree of composition based on an input from said page scroll controller and a time from said timer.

9. A recording medium containing a program according to claim 8, wherein said fourth step makes the image composer output a brightness value of each pixel of the composed image by calculating a sum of a multiplication of a brightness value of each pixel of the previous page image stored in said image buffer by f (t), and a multiplication of a brightness value of each pixel of the present image by 1-f(t).

10. A page display system according to claim 2, wherein the system comprising an image buffer stores page images corresponding to more than 3 pages.

11. A page display system according to claim 1, wherein said display device comprises a LCD and the system comprises a plurality of LCDs capable of displaying said plurality of pages simultaneously.

12. A page display system according to claim 1, wherein said display device comprises a projector type display device, and the system displays a plurality of pages on a screen simultaneously by the use of said plurality of projector type devices.

* * * * *

UNITED STATES PATENT AND TRADEMARK OFFICE
CERTIFICATE OF CORRECTION

PATENT NO. : 6,236,387 B1
DATED : May 22, 2001
INVENTOR(S) : Hideaki Imada

It is certified that error appears in the above-identified patent and that said Letters Patent is hereby corrected as shown below:

<u>Title page,</u>
Please delete Foreign Application Priority Data "November 6, 1997" insert -- November 5, 1997 --

Signed and Sealed this

Twenty-sixth Day of February, 2002

*Attest:*

JAMES E. ROGAN
*Attesting Officer*     *Director of the United States Patent and Trademark Office*